(12) United States Patent
Fritz et al.

(10) Patent No.: US 8,556,025 B2
(45) Date of Patent: Oct. 15, 2013

(54) METHOD FOR MANUFACTURING A DISHWASHER WITH AT LEAST ONE, ESPECIALLY PREFABRICATED, BITUMEN MAT FOR DEADENING OF NOISE AND/OR SOUND ABSORPTION OF A COMPONENT

(75) Inventors: Heiko Fritz, Herbrechtingen (DE);
Bernd Schwenk, Lauingen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 201 days.

(21) Appl. No.: 13/177,602

(22) Filed: Jul. 7, 2011

(65) Prior Publication Data
US 2012/0013228 A1 Jan. 19, 2012

(30) Foreign Application Priority Data
Jul. 16, 2010 (DE) .......................... 10 2010 031 487

(51) Int. Cl.
*G10K 11/04* (2006.01)
*E04B 1/84* (2006.01)
*G10K 1/00* (2006.01)
*E04B 1/74* (2006.01)

(52) U.S. Cl.
USPC .......................................... 181/200; 181/294

(58) Field of Classification Search
USPC ................ 181/200, 201, 202, 290, 285, 294;
134/56 D, 58 D, 57 D; 156/337, 326, 325
See application file for complete search history.

(56) References Cited

U.S. PATENT DOCUMENTS

| | | | | | |
|---|---|---|---|---|---|
| 2,981,361 | A | * | 4/1961 | Schofield | 181/290 |
| 3,020,184 | A | * | 2/1962 | Cubberley et al. | 428/138 |
| 3,193,049 | A | * | 7/1965 | Wollek | 181/208 |
| 3,205,972 | A | * | 9/1965 | Stricker et al. | 181/208 |
| 3,386,527 | A | * | 6/1968 | Daubert et al. | 181/208 |
| 4,495,240 | A | * | 1/1985 | McCarthy | 428/319.1 |
| 4,985,106 | A | * | 1/1991 | Nelson | 156/276 |
| 5,044,705 | A | * | 9/1991 | Nelson | 312/228 |
| 5,743,985 | A | * | 4/1998 | Ernest et al. | 156/243 |
| 5,755,900 | A | * | 5/1998 | Weir et al. | 156/62.2 |
| 5,855,353 | A | * | 1/1999 | Shaffer et al. | 248/638 |
| 5,965,851 | A | * | 10/1999 | Herreman et al. | 181/200 |
| 6,296,076 | B1 | * | 10/2001 | Hiers et al. | 181/290 |
| 6,539,955 | B1 | * | 4/2003 | Tilton et al. | 134/58 D |
| 8,205,287 | B2 | * | 6/2012 | Rockwell et al. | 8/158 |
| 2002/0134615 | A1 | * | 9/2002 | Herreman et al. | 181/290 |
| 2006/0266385 | A1 | * | 11/2006 | Malaker | 134/56 D |
| 2007/0119481 | A1 | * | 5/2007 | Jerg | 134/25.2 |
| 2007/0175907 | A1 | * | 8/2007 | Kempe et al. | 220/639 |
| 2008/0001431 | A1 | * | 1/2008 | Thompson et al. | 296/187.01 |

(Continued)

FOREIGN PATENT DOCUMENTS

DE  102006015498 A1 * 10/2007

*Primary Examiner* — Edgardo San Martin
(74) *Attorney, Agent, or Firm* — James E. Howard; Andre Pallapies

(57) ABSTRACT

In a method for manufacturing a dishwasher having at least one component and at least one bitumen mat provided on the component for noise deadening and/or sound insulation of the component, a usable, flowable and reactively-hardenable bituminous mixture is applied upon the bitumen mat and/or component such as to form at least one adhesive bead. The adhesive bead is partly surrounded by at least one area which is free of the reactively-hardenable bituminous mixture. Before the hardening of the bituminous mixture, the component and the bitumen mat are pressed together and thereby glued to one another.

50 Claims, 4 Drawing Sheets

(56) References Cited

U.S. PATENT DOCUMENTS

2008/0160857 A1* 7/2008 Chacko et al. ............... 442/342
2009/0102336 A1* 4/2009 Buehlmeyer et al. ......... 312/228
2010/0180916 A1* 7/2010 Colon et al. .................... 134/18
2011/0271987 A1* 11/2011 Jerg et al. .................. 134/115 R
2012/0012420 A1* 1/2012 Classen et al. ................ 181/294
2012/0136129 A1* 5/2012 Kohlstrung et al. .......... 526/220

* cited by examiner

METHOD FOR MANUFACTURING A DISHWASHER WITH AT LEAST ONE, ESPECIALLY PREFABRICATED, BITUMEN MAT FOR DEADENING OF NOISE AND/OR SOUND ABSORPTION OF A COMPONENT

BACKGROUND OF THE INVENTION

The present invention relates to a method for manufacturing a dishwasher, especially a household dishwasher, with at least one component which is provided with at least one bitumen mat, especially a prefabricated bitumen mat for noise deadening and/or sound insulation of the component.

The use of prefabricated bitumen mats for noise deadening in components of a dishwasher is known in practice. Nevertheless no means have been able to be found thus far which effect a simple and permanent attachment of the bitumen mat to the respective component.

BRIEF SUMMARY OF THE INVENTION

It is an object of the present invention to provide a method for manufacturing a dishwasher, especially a household dishwasher in which the attachment of one or more, especially prefabricated, bitumen mats to a component is made possible in an improved manner.

The object is achieved for a dishwasher of the type stated above by the bitumen mat being glued to the component by applying a usable, flowable and reactively-hardenable bituminous mixture to the component and/or to the bitumen mat such that at least one adhesive bead is produced which is surrounded by at least one area to which the reactively-hardenable bituminous mixture is not applied and by the component and the bitumen mat being pressed together before the hardening of the reactively-hardenable bituminous mixture.

A bitumen mat is especially to be understood as a mat which is manufactured using a binder consisting of bitumen, also called earth pitch, for example oil distillation bitumen and/or from bitumen-like binders, such as natural asphalts, polymer bitumens, tars, pitches, waxes, paraffins, natural or synthetic resins and/or distillation residues of fats and oils.

If reference is made below to a prefabricated bitumen mat, the term "prefabricated" especially means in this case that the bitumen mat is first produced, independently of the component for which it is intended, as a semi-finished product or a preliminary product with defined dimensions, in order to then enable it to be attached to the component. A prefabricated bitumen mat can be manufactured for example by being cut out or stamped out from a piece of basic mat of the desired size, geometrical shape and/or thickness.

The term "noise deadening" especially relates to a reduction or avoidance of noises which arise through the component or parts thereof being excited into vibrations. Irritating noises can especially occur on thin-walled components such as washing container walling for example, preferably the floor panel and/or the door of a dishwasher to which washing liquor, especially spray jets from spray nozzles of a rotating spray arm, is applied and is thus excited into vibrations. It is however also possible for these types of vibration to be generated by actuators, such as pumps, fans or the like for example. The sound is now deadened in particular by means of an additional mass being applied to the typically thin-walled component by means of the bitumen mat, so that the frequencies of the vibrations occurring become smaller, so that the noises arising are less irritating. In addition at least a part of the vibration energy can be converted into heat through the inner friction in the bitumen mat, so that the intensity of the generated noises reduces.

Furthermore the respective bitumen mat can, additionally or independently of noise deadening, also take care of the sound insulation or soundproofing, i.e. sound reflection of the respective component. In particular the sound from the interior of the washing compartment of the washing container of the dishwasher can be thrown back into the interior of its washing compartment by the respective part of the walling of the washing container with one or more bitumen mats glued to it. In a similar manner the noise deadening and/or sound insulation can naturally also be undertaken for other components, such as for a base support arranged below the washing container, on and/or in which a recirculation pump and/or drain pump is arranged. In particular it can be expedient for the floor panel of the washing container, which can preferably be formed by the roof walling of the base support, to have at least one bitumen mat glued to its underside by a reactively-hardenable, bituminous mixture. The door of the dishwasher can also have at least one bitumen mat glued to it on the outside of its inner walling or inner door or the inside of its outer walling or outer door by a reactively-hardenable bitumen. In addition or independently of this the respective bitumen mat can also ensure a degree of sound proofing.

In accordance with the invention the bitumen mat is glued to the component by usable, flowable and reactively-hardenable bituminous mixture being applied to the component and/or to the bitumen mat such that at least one, preferably elongated, especially linear or strand-like adhesive bead is produced, which is surrounded at least partly by an area to which the mixture is not applied, i.e. remaining free of reactive bitumen mass, and by the component and the bitumen mat being pressed together before the hardening of the bituminous mixture.

Expediently the at least one adhesive bead made of reactively-hardenable bituminous mixture is embodied and applied to the bitumen mat and/or to the respective component for which noise is to be deadened and/or sound insulated such that the unoccupied area, i.e. area remaining free is also covered after the pressing together of the component and the bitumen mat such that a substantially full-surface adhesive layer is respectively produced on the contact surfaces of the component and the bitumen mat that face towards each other. This provides a straightforward adhesion i.e. material-to-material connection of the respective bitumen mat to the respective component for which drumming is to be reduced and/or sound to be deadened via the reactively-hardening bituminous mass between the component and the bitumen mat. The formation of a full-surface layer of adhesive comprising the reactively-hardening bituminous mixture through the pressing together of bitumen mat and component mean that any splitting and/or peeling forces are not able to lead to an undesired release of the respectively applied bitumen mat.

If necessary on the component for which is noise is to be deadened and/or sound insulated, a number of adhesive contact surfaces, especially lying alongside one another, each with an inventively-produced adhesive layer comprising a reactively-hardened bituminous mixture can be provided, which each attach one, especially prefabricated, bitumen mat to the component.

Reactively-hardenable bituminous mixtures in such cases comprise especially at least one basic binder made of bitumen, also called earth pitch, or made of bitumen-type binders which, at a given processing temperature, exhibit a viscosity that is high enough for them to behave almost like a solid body.

The basic binders can typically involve oil distillation bitumen, natural asphalts, polymer bitumen, tars, pitches, waxes, paraffins, natural or synthetic resins and/or distillation residues from fats and oils.

To now enable the bituminous mixture, on application to the respective bitumen mat and/or the respective component, to be able to form at least one adhesive bead and through pressing together of bitumen mat and component to be able to form an especially full-surface adhesive layer, the bituminous mixture contains at least one flux agent which lowers the viscosity of the mixture far enough for it to be flowable at the intended processing temperature in the as yet unhardened state, i.e. to behave like a liquid or especially as a viscous mass. In particular a bituminous mass mouldable or viscous in the unhardened state can be provided by the flux agent. It preferably has a viscosity between $10^2$ and $10^6$ Pa sec at room temperature of 20° C. Flux agents in such cases are preferably non-volatile solvents, especially non-volatile mineral-based oils, tar oils, vegetable and animal fats and oils, carbon acids and non-volatile technical softeners made of synthetic polymers, which also remain in the bituminous mixture, i.e. do not evaporate, after the hardening of the bituminous mixture.

To now cause the bituminous mixture to harden after the formation of the respective adhesive layer, at least one reactive additive is added to the mixture before the formation of the respective adhesive layer to generate a physical and/or chemical effect enhancing the viscosity of the mixture. In this case the effect of the reactive additive can be put in train automatically by the reactive additive or by the addition of a least one activator.

The reactive additive can, if necessary in collaboration with the activator, especially preferably irreversibly cancel the effect of the flux agent, for example by wetting, precipitation or by binding to the basic binder.

The reactive additive can typically be chelating complex agents, acid anhydrides, alcohols, carboxylic acids, fettamines, organic salts, cements, chalk, gypsum, dolomite, ashes, slags, glasses, silicagels and/or alums.

The activator in such cases can especially comprise water, glycols, fatty alcohols, surfactants, acids and alkalis, metal salts, sulphurs, peroxides, latex and/or synthetic resins.

Flux agents based on vegetable and/or mineral oils and/or resins can also be useful. Considered in general terms the flux agents can be obtained from renewable, i.e. regenerative raw materials. In addition or independently of this, the basic binder, the reactive additives and/or the activator can also be produced from at least one renewable raw material.

A useable, flowable and reactively-hardenable bituminous mixture comprises all the necessary components to enable it to be applied in flowable, preferably in viscous form, i.e. expressed in general terms, in a still mouldable state, to the component and/or to the bitumen mat, and to enable it to harden. In particular when the bituminous mixture is sufficiently liquid it can be applied in an advantageous manner by spraying it onto the respective adhesive contact surfaces of the component and/or or the bitumen mat. By comparison with solutions in which the flowable mixture is applied mechanically, for example by means of a brush or a spatula, the adhesive layer can be produced more quickly and more evenly by spraying on or extrusion. The fact that at least one adhesive bead is applied to selected sections or tracks of the respective contact surface of the bitumen mat and/or of the component and that the remaining sections or zones of the respective contact surface initially remain free of bituminous material during the application process, i.e. remain unoccupied, enables time during the application process and bitumen material to be saved. A full-surface distribution of the bituminous material applied in this way in the form of one or more adhesive beads can be ensured in such cases by simply pressing together bitumen mat and component. A substantially closed adhesive layer is thus produced on the respective adhesive contact surface of the bitumen mat provided and/or of the component to be occupied by the latter.

Because of the size and/or weight of standard bitumen mats it can be especially useful to move the means used for applying, especially spraying on or extruding the bituminous mixture, which can comprise a spray nozzle or extrusion nozzle for example, and the component and/or the bitumen mats during the application of the reactively-hardenable bitumen mixture relative to one another in order to gradually provide the surface of the component and/or of the bitumen mat with bituminous mixture.

Since the application of the adhesive material is now undertaken in a first working step such that initially at least one, preferably elongated, especially linear cord-shaped or strand-shaped adhesive bead, also called an adhesive pip is produced, which is surrounded at least partly by a non-applied, i.e. reactive-bitumen-free area, the application of the bituminous mixture can be speeded up by comparison with those solutions in which the component and/or the bitumen mat have the mixture applied them in each case in advance as a single operating step, since in the inventive application method with two operating steps, with an identical width of the respective applied, preferably elongated, especially linear or strand-shaped adhesive bead or adhesive beads comprising reactively-hardenable bituminous material, the overall distance of the required relative movement can be reduced.

In that a further operating step is provided in which, before the hardening of the reactively-hardenable, bituminous mixture applied in accordance with the inventive application principle (first operating step) the component and the bitumen mat are pressed together such that the bituminous mixture expands into the gap area remaining free during the application process, i.e. to which reactive bitumen material has not been applied, between two adjacent sections of the respective adhesive bead or between two adjacent adhesive beads in each case, so that a largely full-surface or closed adhesive layer is produced on the respective adhesive contact surface of the component and/or of the bitumen mat to be glued on, now enables an especially good noise deadening and/or sound insulation to be achieved. Thus the adhesive layer produced in this way especially ensures a close vibration coupling between the component and the bitumen mat, so that a vibration of the component is suppressed largely independently of the bitumen mat.

Expediently the bituminous mixture thus covers the area to which the bituminous mixture has not been originally applied after the pressing together of the component and the bitumen mat so that a substantially full-surface or closed, especially even or homogeneous adhesive layer is produced on the contact surfaces of the component and of the bitumen mat facing towards one another.

The means for applying the usable, flowable and hardenable bituminous mixture in the form of an adhesive bead can typically comprise an extrusion press or a spray device. By extrusion pressing or spraying on the bituminous mixture for example the bituminous mixture can be easily applied. In such cases the bituminous mixture can be applied more quickly as a rule with the spray device or extrusion press device than with a full-surface application by means of the mechanical application means such as a spatula or a paint-brush for example since only transversely spaced adhesive beads, i.e. with a gap between them made of the reactive hardenable bituminous material will be applied to the contact surface of the respective bitumen mat and/or the assigned contact surface of the component for which noise is to be deadened and/or sound insulated. At the same time by pressing together the respective bitumen mat and the respective component a largely closed, especially even or homogenous layer, preferably of largely constant thickness can be produced.

The adhesive layer produced in this way from the reactively-hardened bituminous mixture, by comparison with known adhesives for attaching bitumen mats to components on dishwashers, has superior adhesion properties both on the bitumen mat and also on the usual surface materials of the components of dishwashers. In particular the adhesive layer adheres outstandingly well to plastic parts, especially to parts which are made of polypropylene. But adequate and reliable adhesion or integral connection, i.e. within the material to parts made of bare metal, especially or bare stainless steel, of the adhesive layer of the reactive bituminous mixture to the respective bitumen mats and/or the respective part to be glued to the latter is ensured. In particular the adhesion to a metal part can if necessary be enhanced by pre-treatment of the latter such as with a primer, paint layer or plastic coating for example.

Because of the good adhesion properties of the adhesive layer comprising the reactively-hardened bituminous mixture however in most cases a pre-treatment of the surface of the component, for example roughening, plasma treatment, flaming and the like can be dispensed with, which simplifies the manufacturing of the dishwasher. A priming, painting, plastic coating or other overlay pre-treatment of the component to be occupied by the bitumen mat is often not required in order to achieve a sufficiently reliable adhesion of the adhesive layer on the component.

By comparison to known hot adhesives, which typically demand a processing temperature of for example 130° C. to 200° C., the adhesive layer made from the reactively-hardened bituminous mixture can be established with suitable choice of the components without any provision of heat at room temperature. This enables significant energy savings to the achieved in the manufacturing of the dishwasher. Nevertheless it can be sensible to provide heat when establishing the adhesive layer, in order to speed up the hardening. However far lower temperatures, for example 60 to 70° C., are generally sufficient for this.

In addition, by using a reactively-hardenable bituminous mixture for the application of one or more adhesive beads and thereby in the final analysis for the especially full-surface, preferably largely flat adhesive layer brought about by the pressing together of respective bitumen mat and component when attaching the bitumen mat to the component, the thermal load on the component for which drumming is to be suppressed and or sound deadened, the respective, especially prefabricated, bitumen mat and/or other adjacent components of the dishwasher can be kept low. In many cases this enables less temperature-stable components to be used for the dishwasher than previously, which can reduce the manufacturing costs of the dishwasher.

Compared to the use of known cold adhesives, which typically contain a volatile solvent which evaporates during hardening, the use of reactively-hardenable bituminous mixture as adhesive material for the desired adhesive layer can be more environmentally friendly.

The finished adhesive layer made from reactively-hardened bituminous mixture is also extremely long-lived and can thus outlast the service life of a dishwasher in most cases.

The formation of a drumming-suppression arrangement and/or sound insulation arrangement which comprises the respective component for which noise is to be deadened and/or sound insulated, the inventively produced adhesive layer and the prefabricated bitumen mat, has the advantage over solutions in which exclusively flowable bitumen is applied to the component of a shorter hardening time and possibly also lower material consumption. This enables the manufacturing time for the dishwasher as a whole to be shortened.

In such cases the noise deadening arrangement and/or sound insulation arrangement which comprises the respective component for which noise is to be deadened and/or sound insulated, the inventively produced adhesive layer and the prefabricated bitumen mat, can have almost homogeneous mechanical and acoustic properties. Thus the adhesive layer and the bitumen mat can for example have a comparable thickness, a comparable module of elasticity and/or a comparable degree of sound-deadening and/or absorption, so that the adhesive layer can itself make an effective contribution to suppressing the drumming and/or deadening the sound and/or absorbing the sound of the component. Comparable mechanical properties additionally enable a release or peeling away of the respective bitumen mat from the inventively produced adhesive layer, especially as a result of vibrations or temperature fluctuations, to be prevented even over the long-term. This achieves especially good adhesion of the connection as well as especially good noise reduction.

In accordance with an expedient development of the invention the pressing together of the respective bitumen mat and the respective component for which noise is to be deadened and/or sound insulated, is carried out in a second operational step of the adhesive process such that the bituminous mixture that has been applied before the pressing together in a first operating step of the adhesive process as an elongated adhesive bead or adhesive bead, also covers the area of the component and/or of the bitumen mat to which the bituminous mixture has not been applied so that a substantially full-surface, preferably largely flat adhesive layer is produced between the contact surfaces of bitumen mat and component facing towards each other. In that provision is made before the hardening of the bituminous mixture, for pressing together the component and the bitumen mat such that the bituminous mixture of the respective adhesive bead spreads out into the respective free area to which the bituminous mixture has not be applied, so that overall a full-surface for closed adhesive layer is produced, an especially good noise deadening and/or sound insulation and/or sound absorption is able to be achieved. Thus the adhesive layer produced in this way ensures a close vibration coupling between the component and the bitumen mat, so that a vibration of the component is largely suppressed independently of the bitumen mat.

In accordance with an expedient development of the invention there is provision for the bituminous mixture to be either applied exclusively to the component or exclusively to the bitumen mat in the form of one or more adhesive beads. This enables the inventive method to be carried out in an especially simple manner without functional disadvantages. It is especially preferred in such cases for the bituminous mixture to be applied to the component in the form of at least one adhesive bead, especially laid on it or if necessary sprayed onto it, since the component as a rule is more stable in shape than the bitumen mat and thus is easier to handle than the bitumen mat with the bituminous mass still applied in the unhardened state.

There is provision according to an advantageous development of the invention for at least one adhesive bead in the form of a contiguous, i.e. gapless or uninterrupted bead track, especially in a serpentine shape, to be applied to the component and/or the bitumen mat before the component and the bitumen mat are pressed together. By means of an adhesive bead embodied in this way, especially in a serpentine shape, a large surface of the component or of the bitumen mat is able to be provided with a largely continuous, preferably even, especially equally thick, strand comprising the reactively-hardenable bituminous mixture and without interruption of the application process. A single such track can be sufficient for adequate surface coverage with bituminous mixture. This enables the application of bituminous mixture to be carried out especially quickly and easily. This is particularly true by comparison with solutions in which only individual or separate, especially parallel, adhesive beads are used. The latter can however also be improved in relation to a full surface application. Thus it may be sufficient for a number of adhesive beads in the form of a number of bead tracks separate from one another to be applied to the module and/or to the respective bitumen mat before the pressing together of the module and the bitumen mat.

To summarise the respective adhesive bead is thus preferably applied substantially linearly, as a cord or string shape to the respective component and/or to the respective bitumen mat assigned to said component before they are pressed onto one another. In such cases it can be advantageous especially in respect of handling and adhesive quality for at least one adhesive bead in the form of an individual contiguous bead track, especially in a serpentine shape, to be applied to the component and/or the bitumen mat before the component and the bitumen mat are pressed together.

If necessary it can also be sufficient for a number of adhesive beads in the form of a number of separate tracks to be applied to the component and/or to the respective bitumen mat before the component and the bitumen mat are pressed together.

In accordance with an expedient development of the invention it can be especially advantageous if, before the pressing together of the component and the bitumen mat, at least one adhesive bead is applied to an edge area of the respective adhesive contact surface of the component and/or of the bitumen mat such that it runs around the edge area of the respective adhesive contact surface as a part or entirely enclosed loop or ring bead. A loop or ring bead formed in this way can for example be embodied angular or circular, depending on the shape or contour of the edge area. Such an edge area can for example be formed by an outer edge zone on the adhesive contact surface along the outer edge, i.e. outer delimiting edge of the bitumen mat and/or of the component for which noise is to be deadened and/or sound insulated. A breakthrough can also be formed by an inner edge zone on the adhesive contact surface all around it which lies within the adhesive contact surface of the bitumen mat or of the component for which noise is to be deadened and/or sound insulated. These partly or entirely closed adhesive bead frames of one or more outer and/or inner edge zones of the adhesive contact surface of the respective bitumen mat to be attached or of the respective contact surface of the respective component for which noise is to be deadened and/or sound insulated delimit the respective adhesive contact surface outside or inside. In this way, especially at the respective edge zone area of the bitumen mat, an especially durable and stable adhesive connection can be achieved, so that the danger of the bitumen mat releasing or peeling away from the assigned component during subsequent operation of the dishwasher is reduced.

For example a mesh-type adhesive bead can be provided which runs around the edge of an outer edge area on the adhesive contact surface of the bitumen mat which is delimited by the outer circumferential contour of the bitumen mat. In addition or independently of this a mesh-type adhesive bead can also be provided which runs all around an outer edge area on the adhesive contact surface of the component for which noise is to be deadened and/or sound insulated, which is delimited by the outer circumferential contour of the component. In this way an especially durable and stable adhesive connection is obtained, so that the danger of a release or peeling away of the bitumen mat especially during subsequent operation of the dishwasher at the outer edge area of the bitumen mat is reduced.

As an alternative or in addition a mesh-type adhesive bead can run along an inner edge area of the adhesive contact surface of the bitumen mat, which for example delimits an opening in the bitumen mat. In this way the adhesive connection is further improved since the danger of a release or peeling off of the bitumen mat at its inner edge zones during subsequent operation of the dishwasher is largely avoided. In an analogous manner, in addition or independently thereof, an inner area on the component for which drumming is to be suppressed or sound deadened can be occupied by at least one adhesive bead.

In accordance with an advantageous development of the invention the bitumen mat has at least one rounded-off corner area. This enables the durability of the adhesive connection to be improved as an alternative or in addition since rounded-off sections in its corner areas make it more difficult for the bitumen mat to be pulled off or peeled off.

In accordance with an advantageous development of the invention the rounded-off corner has a radius of at least 2 mm, preferably at least 4 mm, especially preferably at least 6 mm and/or of at most 30 mm preferably at most 20 mm, especially preferably at most 15 mm. The specified minimum values for the radii ensure a good adhesion of the adhesive connection, with the specified maximum radii ensuring that, even in the corner areas of the component, noise deadening by the bitumen mat is possible.

In accordance with a further expedient advantageous development of the invention at least one adhesive bead is embodied and applied such that, when the component and the bitumen mat are pressed together, it swells out from an edge side adhesive joint between the component and the bitumen mat and partly or completely encompasses an edge section of the bitumen mat and/or of the component. Sheer-off and peel-off forces are better counteracted in this way and the adhesion at the sides of the bitumen mat is improved.

In accordance with an expedient development of the invention there is provision for the component and the bitumen mat to be pressed together so that the adhesive layer obtains a bead-like section which at least partly surrounds a lateral edge area of the bitumen mat which run transversely, especially at right angles, to its contact surface. The bitumen mat thus obtains an additional fixing acting at its side surface so that the durability of the adhesive connection is improved.

In accordance with an advantageous development of the invention the average width of the adhesive bead amounts to at least 2 mm, preferably at least 4 mm, especially preferably at least 6 mm and/or at most 30 mm, preferably at most 20 mm, especially preferably at most 15 mm. The specified minimum values enable the overall length of the adhesive bead or of the adhesive beads to be kept short, whereby the specified maximum values achieve a sufficiently even application of the bituminous mixture per desired, predetermined adhesive surface, in order during subsequent pressing together of the component and of the bitumen mat to enable a full-surface adhesive layer to be achieved.

In accordance with an expedient development of the invention the average spacing between two sections running alongside one another, especially running in parallel with one another, of an adhesive bead or of a number of adhesive beads amounts to at least 1.0 times the width of the adhesive bead or of the adhesive beads, preferably at least 1.2 times, especially preferably at least 1.5 times and/or at most 4.0 times the width of the adhesive bead or of the adhesive beads, preferably at most 3.0 times, especially preferably at most 2.0 times. The specified minimum values enabled the overall length of the adhesive bead or of the adhesive beads to be further reduced, whereby a sufficiently even application of the bituminous mixture per surface is achieved by the specified maximum values, in order during subsequent pressing together of the component and the bitumen mat, to be able to achieve a full-surface adhesive layer.

In accordance with an advantageous development of the invention the sprayed-on mass of the bituminous mixture in relation to the surface of the bitumen mat pointing towards the component, amounts to at least $0.1$ $kg/m^2$, preferably at least $0.2$ $kg/m^2$, especially preferably at least $0.3$ $kg/m^2$ and or at most $2.0$ $kg/m^2$, especially at most $1.2$ $kg/m^2$, especially preferably at least $0.8$ $kg/m^2$. The specified minimum values enable a sufficiently stable adhesive connection to be ensured, whereby the specified maximum values prevent the adhesive layer running during later operation of the dishwasher when heated up.

In accordance with an expedient development of the invention the time between the production of the usable, flowable and hardenable bituminous mixture and the pressing together of the component and the bitumen mat amounts to at most 90 seconds, preferably at most 75 seconds, especially preferably at most 60 seconds. In this way it is possible to use especially rapidly hardening bituminous mixtures, which reduces the manufacturing time of the dishwasher. In addition the bituminous mat is prevented from coming loose during the hardening time of the bituminous mixture in this way.

In accordance with an expedient development of the invention the usable, flowable and hardenable bituminous mixture is produced by a mixture being formed from a first component and a second component, with the first component containing a basic binder, a flux oil and a reactive additive, which are tailored to one another so that an activator is required for hardening, and with the second component containing the activator; or with the first component containing a basic binder and a flux oil which are tailored to one another so that a reactive additive is required for hardening, and with the second component containing the reactive additive; or with the first component containing a basic binder and a flux oil which are tailored to one another so that a reactive additive and an activator are required for hardening, and with the second component containing the reactive additive and the activator.

In this way the usable, flowable and hardenable bituminous mixture is produced in each case by mixing two components which are able to be stored over a longer period separately from one another. The usable, flowable and hardenable bituminous mixture can in such cases be produced directly before the application to the module and/or to the bitumen mat by simple mixing of the components, through which the hardening starts. Problems caused by hardening too soon can be avoided in this way.

In accordance with an advantageous development of the invention the component is a part of the walling for delimiting a washing compartment of the dishwasher. A washing compartment is to be understood as a compartment of the dishwasher which is provided to accommodate items to be washed, especially crockery, during a washing cycle, also referred to as the washing process. Usually the washing compartment is disposed in a box-shaped washing container which can be made up of a number of walling sections. For example the washing container can comprise a first walling section which is embodied as a U-shaped washing container hood and a first side wall, a second side wall opposite said wall and a roof of the washing container so that the washing compartment is delimited on two opposing sides and upwards. A second walling section of the washing container can be embodied as a rear wall and delimit the washing compartment on a third side. Furthermore the washing container can include a third walling section which is embodied as a floor panel, also referred to as a base sump and which delimits the washing compartment downwards. The remaining side of the washing container can be closable by means of a movable door which includes a fourth walling section embodied as an inner door which, when the door is closed, delimits the washing compartment on the fourth side. However other arrangements of walling sections are conceivable. For example the door could be provided on the upper side of the washing compartment so that the washing compartment is able to be loaded from above.

The walling sections delimiting the washing compartment are usually embodied as thin walls. Thus, depending on material, wall thicknesses ranging from 0.3 to 2 mm are usual. In these cases the walling sections come into contact with circulated washing liquor on their inner side during a washing cycle so that they are strongly excited into vibrations, which can cause undesired noises. By now gluing at least one bitumen mat by means of an adhesive layer comprising a reactively-hardenable bituminous mixture to one or more of the walling sections, the noise emission of the dishwasher can be greatly reduced.

In accordance with an advantageous development of the invention the adhesive layer is laterally delimited by at least one delimiting element protruding from the component. In this way the bituminous mixture can be prevented, before it has hardened completely, from flowing away in parallel to the surface of the component. In addition the contact surface between the component and the adhesive layer can be increased in this way so that the connection between component and adhesive layer becomes more resistant to loads. In such cases there can be provision for the adhesive layer to be partly bounded or completely bounded by the least one protruding delimiting element. The delimiting element can especially be embodied as a web of which the height can exceed the height of the adhesive layer, through which the bitumen mat can be protected at its edge from external influences, for example during the manufacturing of the dishwasher.

In accordance with an expedient development of the invention the bitumen mat is glued to a three-dimensionally structured surface of the component. This enables the contact surface between component and adhesive layer to be further enlarged so that the connection between component and adhesive layer is able to be subjected to even greater loads. The structured surface can especially feature an embossing, in the form of honeycombs, which is then especially easy to manufacture if the component is a sheet metal component.

In accordance with an advantageous development of the invention the structured surface includes at least one web and/or at least one groove, i.e. expressed in general terms raised sections and or lowered sections. These bring about a three-dimensionally structured surface and can especially be embodied on plastic parts, especially injection moulded plastic parts, in a simple manner in terms of manufacturing.

In accordance with an advantageous development of the invention the component is thus a plastic part, especially made of polypropylene. The adhesive layer of the reactively-hardenable bituminous mixture is especially well suited to components made of plastic since the bitumen mat can be glued on at "relatively cold" temperatures which are lower than for the use of a hot adhesive, so that damage to temperature-sensitive plastics can be avoided. In addition on most plastics, especially on polypropylene, a correspondingly composed, reactively-hardened bituminous mixture exhibits a better adhesion than known hot or cold adhesives.

In accordance with an expedient development of the invention the component can also be a painted part or plastic coated or otherwise primed part, especially made of metal. The adhesive layer made from the reactively-hardened bituminous mixture is especially well suited for those parts since here too, temperature damage to the paint, the plastic coating or the primer can be prevented and a good adhesion can be achieved.

In accordance with an expedient development of the invention drumming of the component is suppressed or sound deadened for it by a layer arrangement which is formed exclusively by the bitumen mat and the adhesive layer. This enables an effective and durable noise deadening of the component to be brought about in a simple manner. Basically it would also be possible to arrange a number of adhesive layers and bitumen mats in the form of a stack. Also a number of bitumen mats could be glued on next to each other with and without a space between them at defined occupied surfaces on the component for which noise is to be deadened and/or sound insulated by means of the reactively-hardenable bituminous mass.

In accordance with an advantageous development of the invention the respective bitumen mat has a maximum thickness ranging from 0.8 mm to 8 mm, preferably ranging from 1.2 mm to 6 mm, especially preferably ranging from 1.6 mm to 4 mm. In the said ranges an adequate noise deadening and/or sound insulation of components of the dishwasher can be achieved with low material use. In such cases the bitumen mat can have a consistent thickness or variable thickness.

In accordance with an advantageous development of the invention the adhesive layer has a maximum thickness ranging from 0.1 mm to 6 mm, preferably ranging from 0.2 mm to 3 mm, especially preferably ranging from 0.4 mm to 1.5 mm. In the said ranges the adhesive layer is sufficiently thick, even with undesired unevenness and/or for a desired three-dimensional structuring of the surface of the component and/or the surface of the bitumen mat, to achieve a largely full-surface contact between the adhesive layer and the component and/or the bitumen mat. This achieves an especially stable arrangement with an especially good noise deadening effect and/or sound insulation effect. In such cases an increased use of material is avoided at the same time.

Furthermore the invention relates to a dishwasher, especially a household dishwasher with at least one component which is provided with at least one, especially prefabricated, bitumen mat for noise deadening and/or sound insulation of the component, which is characterised in that it is produced by a method of the type described above. These stated advantages are the result.

There is provision in the inventive dishwasher for the component and the bitumen mat to be glued to each other by means of at least one adhesive bead comprising a flowable and reactively-hardenable bituminous mixture in the ready-to-use state.

The invention likewise relates to a facility for manufacturing a dishwasher, especially a dishwasher of the type described here, with at least one component which is provided with at least one, especially prefabricated, bitumen mat for noise deadening and/or sound insulation of the component. In the inventive facility means are provided for applying at least one, especially linear or strand-shaped adhesive bead of usable, flowable and reactively-hardenable bituminous mixture, which is surrounded at least partly by at least one area to which the mixture is not applied, especially not sprayed, to the component and/or to the bitumen mat as well as means for pressing together the component and the bitumen mat.

The means for supplying a usable, flowable and reactively-hardenable bituminous mixture in the form of one or more bead tracks to the component and/or to the bitumen mat can especially be a spray device for spraying onto the component and/or the bitumen mat a bituminous mixture flowable in its processing state. As an alternative a nozzle facility is especially useful, from which one or more strands of reactively-hardenable bituminous material are pressed and can be applied to the respective contact surface of the bitumen mat and/or the respective component.

The means for joining together the component and the bitumen mat can include means for handling the component and means for handling the bitumen mat which are able to be moved relative to one another. For example the means for joining the component and the bitumen mat can be formed by one or more industrial robots.

The application means, especially the means for extrusion pressing or spraying on the bituminous mixture can be movable in relation to the means for handling the component and/or the means for handling the bitumen mat, so that in a simple manner, by means of an extrusion or spray jet which when seen in cross-section is preferably round, especially roughly circular or point shaped, adhesive beads can be created on the component and/or the bitumen mat.

The facility can especially be fully automated and for example controlled by an industrial computer.

The inventive facility makes it possible to carry out the inventive method in a simple, rapid and safe manner.

The advantageous developments of the invention specified in the dependent claims and/or explained here can be provided individually or in any given combination with one another.

BRIEF DESCRIPTION OF THE DRAWINGS

The invention and its developments and their advantages will be explained in greater detail below with reference to drawings, in which the respective drawings show the following schematic diagrams.

DETAILED DESCRIPTION OF EXEMPLARY EMBODIMENTS OF THE PRESENT INVENTION

Figure 1:
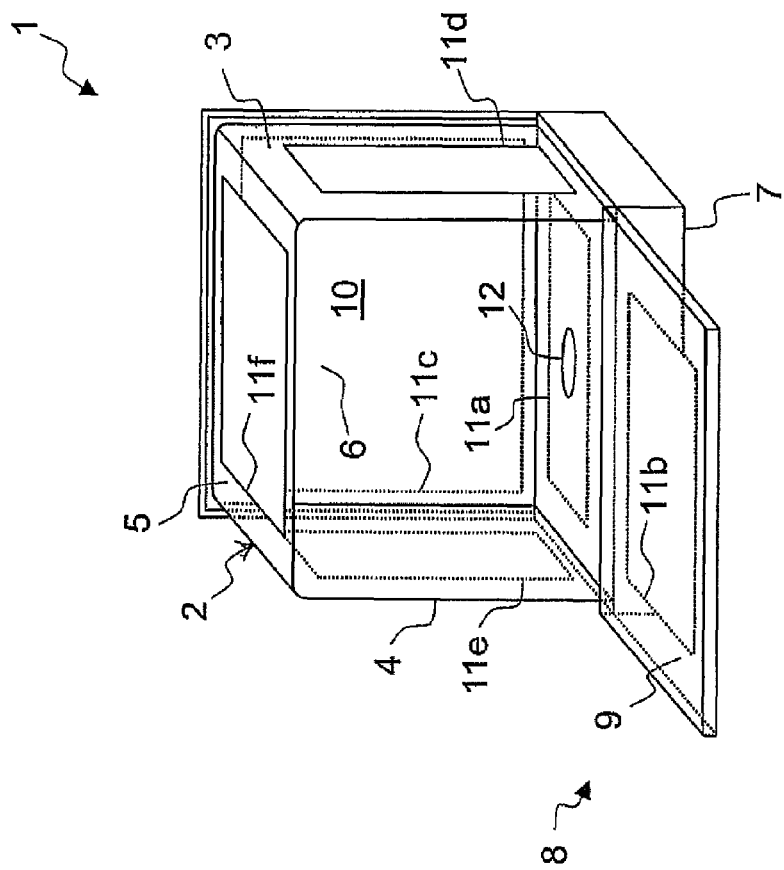
FIG. 1 an exemplary embodiment of a washing container with a door assigned to it for an inventive dishwasher in a schematic spatial view, FIG. 2 a more detailed part diagram of the dishwasher of FIG. 1, whereby a part of the floor panel of the washing container and a part of a bitumen mat glued on by means of an adhesive layer are shown, FIG. 3 a diagram to illustrate a method and a facility for manufacturing the dishwasher of FIGS. 1 and 2, and FIG. 4 a further diagram to illustrate a method for manufacturing the dishwasher of FIGS. 1 and 2.

Parts that correspond to one another are provided with the same reference characters in the figures below. In such cases only those components of the dishwasher as are necessary for understanding the invention are provided with reference characters and explained. It goes without saying that the inventive dishwasher can comprise further parts and modules.

FIG. 1 shows a box-shaped washing container of an exemplary embodiment of an inventive dishwasher. The washing container 1 comprises a first walling section 2 which forms a first side wall 3, a second side wall 4 and a roof of the box-shaped washing container 1. Such a first walling part 2 is also referred to as a washing container hood 2. Here this has the cross-sectional geometrical shape of an upturned "U". A second walling part 6 of the washing container 1 is embodied as a rear wall. Also the washing container 1 has a floor panel as its third walling section 7. The washing container hood 2 and the rear wall 6 are embodied here in the present exemplary embodiment as stamped and bent parts 2, 6 made of sheet stainless steel. By contrast the floor panel 7 preferably involves an injection moulded part 7 made of plastic, especially of polypropylene (PP).

To be able to close off an open side of the washing container 1, a movable door 8 is assigned to the washing container 1, which features an inner door as a fourth walling section 9 which can likewise be a stamped and bent part made of stainless steel. The door 8 is shown in an open position in FIG. 1 and can be moved into a closed position by hinging, so that a closed washing compartment 10 is produced in which items to be washed, especially crockery, can be cleaned by applying a washing liquor to them. The washing compartment 10 is delimited in this case by the inner side of the walling sections 2, 6, 7, 9, so that an uncontrolled exit of washing liquor is avoided. The arrangement of the walling sections 2, 6, 7, 9 is by way of example here, with other arrangements of walling sections also being conceivable. For example a door could be provided on the upper side of the washing compartment 10 so that the washing compartment 10 is able to be loaded from above. Likewise the washing compartment 10 could be arranged in a washing container which is designed as a pull-out drawer.

The walling sections 2, 6, 7, 9 delimiting the washing container have recirculated washing liquor applied to their inner side during a washing cycle so that they can be excited into vibrations which can cause undesired noises. It is however also possible for such vibrations to be generated by actuators of the dishwasher not shown in the diagram, such as pumps, fans or the like for example. Since the walling sections 2, 6, 7, 9 are embodied as thin walls an especially high level of noise can be produced.

In order to now prevent irritating noise generation or at least to reduce it and/or to deaden the sound, noise deadening and/or sound insulation or sound absorption of the walling sections 2, 6, 7, 9 is provided by means of prefabricated bitumen mats 11a-11f.

The bitumen mats 11a-11f are mats which are produced using a binder from bitumen, also called earth pitch, or from bitumen-type binders such as polymer bitumens, tars, pitches and/or distillation residues of fats and oils for example. The term "prefabricated" especially means in such cases that the respective bitumen mat 11a-11f is initially produced independently of the component for which it is intended, i.e. here independently of the walling sections 2, 6, 7, 9, as a semi-finished product with defined dimensions, thickness, geometrical shape and/or structure etc. . . . to then enable it to be attached to the respective component 2, 6, 7, 9. A prefabricated bitumen mat 11a-11f can be manufactured for example by a piece of the desired size being cut or stamped out of a basic mat.

The noise deadening and/or sound insulation of the walling sections 2, 6, 7, 9 is now achieved especially by an additional mass being applied by means of the bitumen mats 11a-11f to the typically thin-walled walling section 2, 6, 7, 9, so that the frequencies of the vibrations occurring become smaller, so that the noises arising are less disruptive. In addition through the inner friction in the bitumen mats at least a part of the vibration energy can be converted into heat, so that through this sound insulation property of the bitumen mats the intensity of the generated noises reduces. The bitumen mats 11a-11f are expediently attached to outer surfaces of the walling sections 2, 6, 7, 9 pointing away from the washing compartment, so that the bitumen mats 11a-11f do not have washing liquor applied to them.

In the exemplary embodiment a first bitumen mat 11a is provided for anti-drumming and/or sound insulation or sound absorption of the floor panel 7. The first bitumen mat 11a typically features a rectangular outline and approximately in its centre a circular opening for a pump sump 12 only indicated in the diagram in the floor panel 7 of the washing container 1 of the dishwasher. A second rectangular bitumen mat 11b is provided for noise deadening of the inner door 9 and a third rectangular bitumen mat 11c for noise deadening of the rear wall 6. Drumming is suppressed and/or sound deadened for the washing container hood 2 by means of a fourth bitumen mat 11d which is arranged in the area of the first side wall 3, by means of a fifth bitumen mat 11e, which is arranged in the area of the second side wall 4, and by means of a sixth bitumen mat 11f, which is arranged in the area of the roof 5. The floor panel 7 in this case especially forms a roof wall of a plastic base module or of a basic support component which is arranged below the washing container 1.

Figure 2:
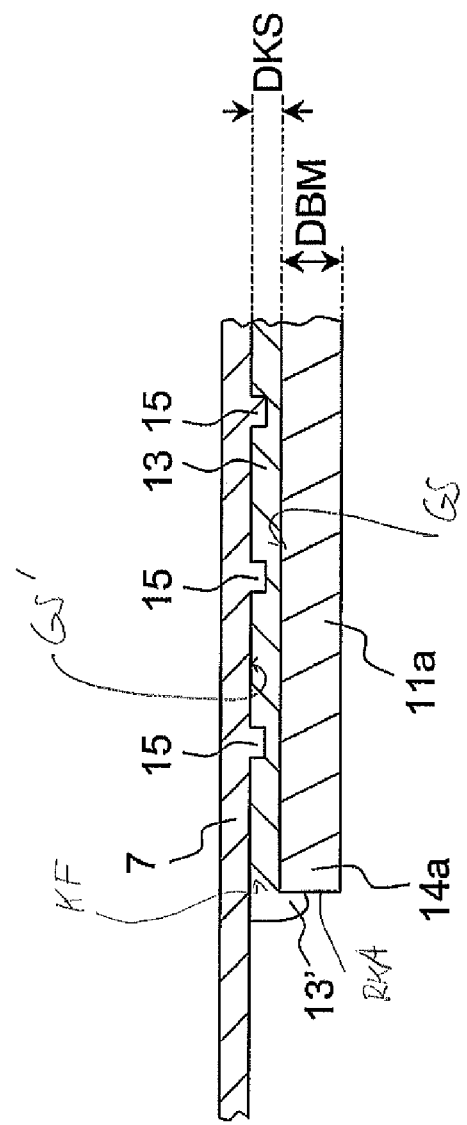

FIG. 2 shows an example of a more detailed part of the dishwasher of FIG. 1, with the diagram showing a part of the floor panel 7 of the washing container 1 and a part of a bitumen mat 11a glued to the underside of the floor panel by means of an adhesive layer 13. The explanations given below for attaching the bitumen mat 11a by means of the adhesive layer 13 to the floor panel 7 apply equally to the attachment of the bitumen mats 11b-11f to the other components 2, 6, 9 for which noise is to be deadened and/or sound insulated.

Inventively an adhesive layer comprising a bituminous mixture reactively-hardened in the completely assembled state of the dishwasher is provided for attaching the prefabricated bitumen mat 11a to the underside of the floor panel 7.

Reactively-hardenable bituminous mixtures in such cases especially comprise at least one basic binder of bitumen, also called earth pitch, or bitumen-like binders, which at an intended processing temperature has such a high viscosity that they behave almost like a solid body.

In order to now shape the bituminous mixture into one or more adhesive beads, apply these to adhesive contact surfaces of the bitumen mat and of the floor panel facing towards one another and to be able to form from these adhesive beads by finally pressing together bitumen mat and floor panel, an adhesive layer which completely covers the adhesive contact surface of the bitumen mat and the corresponding adhesive contact surface on the underside of the floor panel facing towards said mat largely completely and full-surface, i.e. in a closed manner, it contains at least one flux agent which reduces the viscosity of the mixture far enough for it to be flowable, especially viscous at the intended processing temperature, i.e. for it to behave like a shapeable mass. Flux agents in this case are especially non-volatile solvents which remain after the hardening of the bituminous mixture in the bituminous mixture, i.e. do not evaporate from it.

To cause the adhesive layer made of the originally flowable bituminous mixture which after the formation of one or more adhesive beads from this by pressing together bituminous mat and floor panel has been created over the full surface, to harden, the mixture, before the formation of the one or more adhesive beads and the adhesive layer produced therefrom, has at least one reactive additive to generate the physical and/or chemical reaction increasing the viscosity of the mixture added to it. In this case the effect of the reactive additive can be put in train automatically by the reactive additive or by the additional provision of an activator.

The reactive additive can if necessary in conjunction with the activator, especially preferably irreversibly, cancel the effect of the flux agent, for example by wetting, precipitating or binding onto the basic binder.

Figure 4:
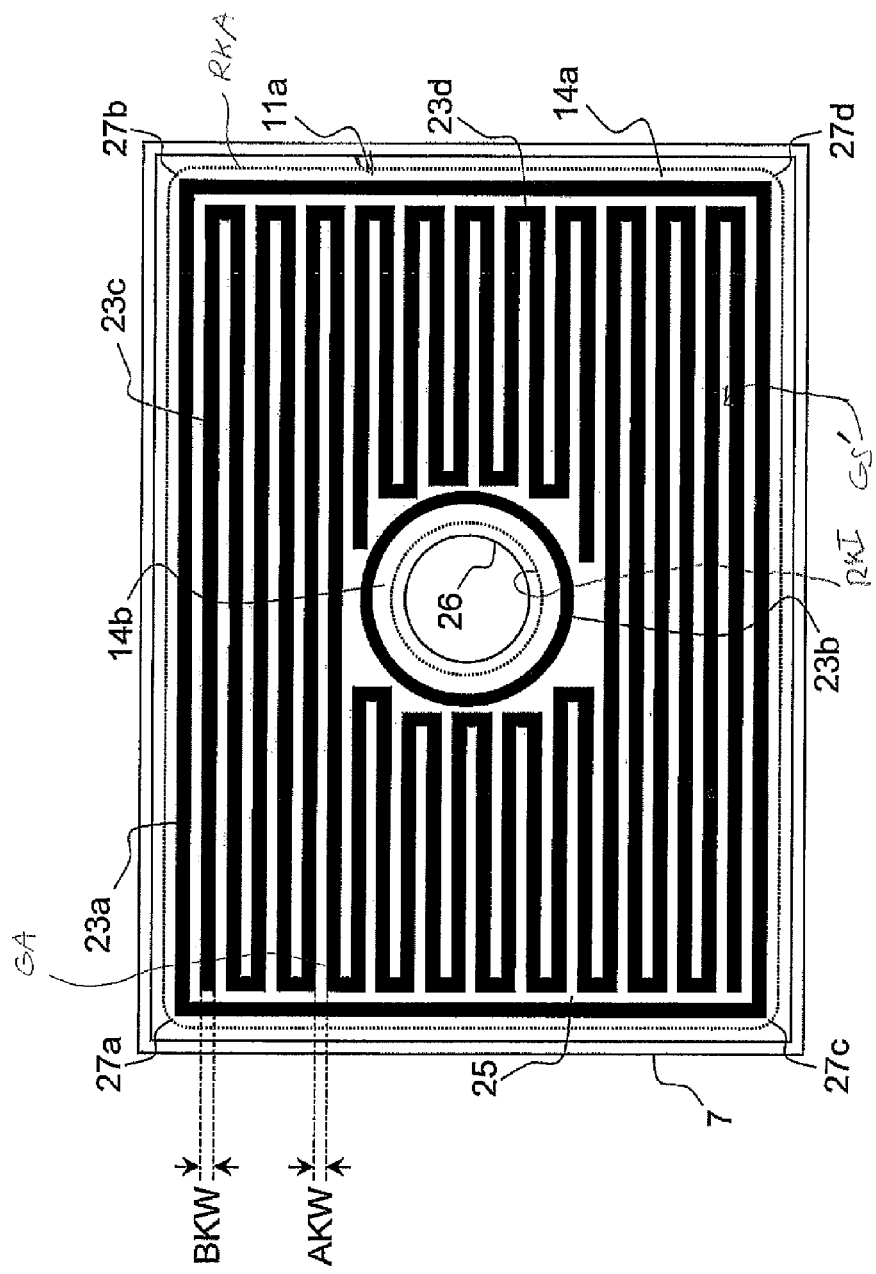

The adhesive layer 13 is expediently embodied so that it has a bead-shaped section 13' which partly encloses an outer edge area RKA of the bitumen mat 11$a$. This gives the bitumen mat 11$a$ an additional fixing acting on its lateral edge surface so that the durability of the adhesive connection is improved. The lateral edge surface of the bitumen mat 11$a$ in this case runs transverse, especially at right angles to the adhesive contact surface GS, with the bitumen mat adhering by means of the adhesive layer 13 to the underside adhesive contact surface GS' of the floor panel 7. In addition the shared contact surface of the floor panel 7 and the adhesive layer 13 can be enlarged in this way so that the connection of floor panel 7 and adhesive layer 13 is able to withstand loads, especially to be largely insensitive to any shearing or peeling forces acting on it. In particular for this purpose an adhesive bead such as for example 23$a$ (see FIG. 4) made of the reactively-hardenable bituminous mixture is embodied and applied such that, when the bitumen mat 11$a$ is pressed onto the underside of the floor panel 7 it is squeezed out of an edge side adhesive joint KF between the floor panel 7 and the bitumen mat 11$a$ and partly or entirely encompasses the outer edge section RKA of the bitumen mat 11$a$. In FIG. 4 the adhesive bead 23$a$ is embodied as a single contiguous bead track which surrounds the adhesive contact surface GS' on the underside of the floor panel 7 at its edge in the form of a rectangular frame, i.e. it runs along an annular edge zone 14$a$ on the adhesive contact surface around the outer circumference following its outer contour. In this case this outer edge zone 14$a$ corresponds to the adhesive contact surface GS' of the floor panel 7 with the outer edge zone of the adhesive contact surface GS of the bitumen mat 11$a$.

Expediently the bitumen mat 11$a$ is glued onto a three-dimensionally structured surface of the floor panel 7. This enables the contact surface of the floor panel 7 with the adhesive layer 13 to be further increased so that the connection between floor panel 7 and adhesive layer 13 is even more able to withstand loads.

In this case the structured surface in the exemplary embodiment features bars 15 as raised sections. The bars 15 bring about a three-dimensional structuring of the surface and can be embodied especially simply on injection moulded parts, such as the floor panel 7 for example. As an alternative one or more grooves, or expressed in general terms lowered sections, can be provided for structuring the surface.

Since the floor panel 7 is a plastic part, which can especially be manufactured from polypropylene, the adhesiveness of the reactively-hardenable bituminous mixture to plastic can be used in order to create a material-to-material, internal and thus stable connection between the floor panel 7 and the bitumen mat 11$a$. The adhesive layer 13 of the reactively-hardenable bituminous mixture is especially suitable for the floor panel 7 made of plastic, since the bitumen mat 11$a$ can be glued on at temperatures which are lower than those used for a hot adhesive, so that temperature-related damage can be avoided. In particular a room temperature of around 20° C. can suffice.

Advantageously the floor panel 7 has its anti-drumming and/or sound insulation provided by a layer arrangement which is exclusively formed by the bitumen mat 11$a$ and the adhesive layer 13. This enables an effective and permanent anti-drumming of the floor panel 7 to be achieved in a simple manner. Basically however it would be possible to arrange a number of adhesive layers 13 and bitumen mats 11$a$ in the form of a stack. A number of bitumen mats such as 23$c$, 23$d$ in FIG. 4 for example can be arranged next to one another and with no gap between them and glued on and/or into the component for which anti-drumming and/or sound insulation is to be provided by means of one or more strand-like or linearly-applied adhesive beads of the reactively-hardenable bituminous mixture. In this case the one or more adhesive beads are pressed together by pressing together the bituminous mats on the desired adhesive contact surface of the respective component for which noise is to be deadened and/or sound insulated, in this case the floor panel, such that a largely full-surface adhesive layer is produced which also fills out regions or zones within the desired adhesive contact surface not filled with reactive bitumen before.

Preferably the bitumen mat 11$a$ has a maximum thickness DBM ranging from 0.8 mm to 8 mm, preferably ranging from 1.2 mm to 6 mm, especially preferably ranging from 1.6 mm to 4 mm. Sufficient anti-drumming and/or sound insulation of the floor panel 7 of the dishwasher can be achieved in the said areas with low use of material. In this case the bitumen mat 11$a$ as shown can have a consistent thickness but also a variable thickness.

Advantageously the adhesive layer 13 has a maximum thickness DKS ranging from 0.1 mm to 6 mm preferably ranging from 0.2 mm to 3 mm, especially preferably ranging from 0.4 mm to 1.5 mm. In the said areas the adhesive layer 13 is sufficiently thick, even with undesired unevenness and/or with a desired three-dimensional structuring of the surface of the floor panel 7 and/or of the surface of the bitumen mat 11$a$, to achieve a full-surface contact of the adhesive layer 13 with the floor panel 7 and/or with the bitumen mat 11$a$. An especially stable arrangement with especially good anti-drumming effect is achieved by this. In this case an excessive use of material is avoided at the same time.

Figure 3:
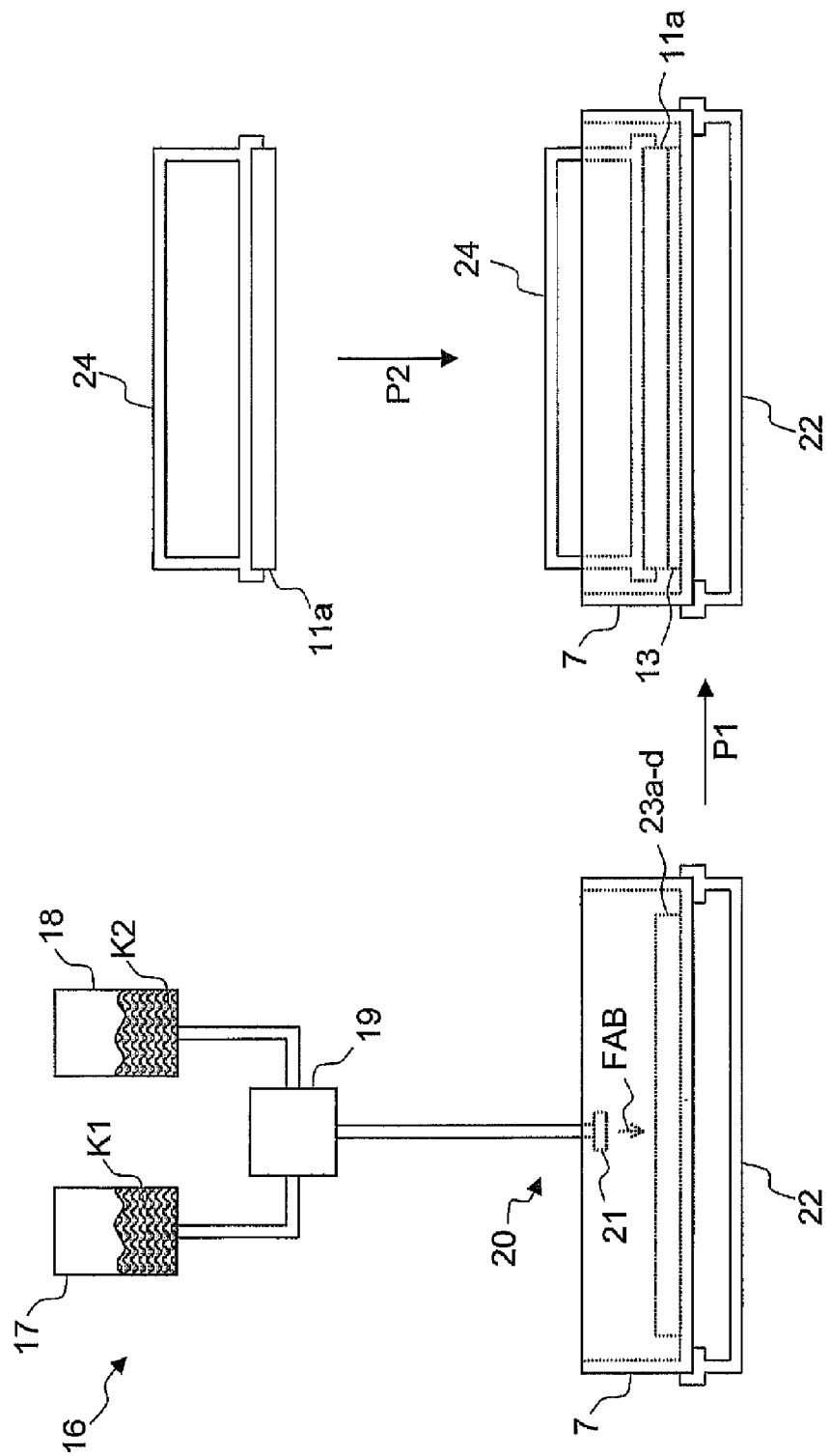

FIG. 3 shows a diagram to illustrate a method and a facility for manufacturing the dishwasher of FIGS. 1 and 2.

FIG. 3 shows a typical example of how the prefabricated bitumen mat 11$a$ is glued onto the floor panel 7.

For this purpose the inventive facility comprises means 16 for applying a usable, flowable and reactively-hardenable bituminous mixture FAB to the floor panel 7. As an alternative or in addition means could also be provided for applying a usable, flowable and reactively-hardenable bituminous mixture FAB to the bitumen mat 11$a$.

The means 16 for applying a usable, flowable and reactively-hardenable bituminous mixture FAB comprise in the exemplary embodiment a first container 17 to accept a first storable component K1 of the reactively-hardenable bituminous mixture as well as a second container 18 to accept a second storable component K2 of the reactively-hardenable bituminous mixture.

In this case the first component K1 can contain a basic binder, a flux oil and a reactive additive, which are tailored to one another such that an activator is required for hardening, with the second component K2 containing the activator.

As an alternative the first component K1 can container basic binder and a flux oil which are matched to one another so that a reactive additive is required for hardening, with the second component K2 containing the reactive additive.

In accordance with a further alternative the first component K1 can contain a basic binder and a flux oil which are matched to one another so that a reactive additive and an activator is required for hardening, with the second component K2 containing the reactive additive and the activator.

In all of the said cases it is now possible, by mixing the first component K1 and the second component K2, to produce a usable, flowable and hardenable bituminous mixture FAB. A usable, flowable and hardenable bituminous mixture FAB includes all the necessary components to enable it to be applied in flowable form, if necessary in viscous form, to the floor panel 7 and/or to the bitumen mat 11a and to enable it to harden. This enables the adhesive layer 13 to especially be produced by just one application or addition of material.

In this case the inventive facility features a mixer 19 for mixing the first component K1 and the second component K2, which is connected to the first container 17 so that the first component K1 is able to be fed to it, and which is connected to the second container 18 so that the second component K2 is likewise able to be fed to it. The usable, flowable and hardenable bituminous mixture FAB produced in this way can then be fed to an application device 20 for applying or attaching the flowable bituminous mixture FAB to the bitumen mat 11a. In particular the usable, flowable and hardenable bituminous mixture FAB can be applied by means of an extrusion press or other nozzle device to the bitumen mat 11a. The application device 20 can in this case feature at least one nozzle 21 for extruding a strand or a bead track of the usable, flowable and hardenable bituminous mixture FAB onto the floor panel 7.

If the reactively-hardenable bituminous mixture is sufficiently liquid, a spray device can possibly be expediently used as an application facility for spraying on one or more adhesive beads.

The floor panel 7 is presented to the spray device 20 by handling means 22 handling the floor panel 7. The handling means 22 and the spray device 20 are able to be moved relative to one another, so that linear, cord or strand-shaped cable beads 23a-23d can be produced from the usable bituminous mixture FAB from a contiguous bead track in each case. The adhesive beads cover each other in FIG. 3 because of the lateral perspective.

The bitumen mat 11a to be glued on can be held ready by a handling means 24 for handling the bitumen mat 11a. The handling means 22 and 24 of the advantageous application facility are embodied in this case so that they are able to be moved relative to one another. In this case it is made possible by these for the floor panel 7 and the bitumen mat 11a provided in the first operating step with the linear, cord shaped or strand shaped adhesive beads 23a-23d to be pressed together in the second operating step so that the adhesive beads 23a-23d are reshaped into the full-surface or closed adhesive layer 13 depicted in FIG. 2. In the example of FIG. 3 the handling means 22, as indicated by the arrow P1, first moves for this purpose into a position for joining the floor panel 7 and the bitumen mat 11a. The handling means 24 is then moved in the direction of the now stationary handling means 22. It would however also be possible to exclusively move only the handling means 22 or exclusively only the handling means 24 to press together the bitumen mat 11a and the floor panel 7.

Advantageously the time between the production of the usable, flowable and hardenable bituminous mixture FAB and the pressing together of the floor panel 7 and the bitumen mat 11a amounts to 90 seconds at most, preferably 75 seconds at most, especially preferably 60 seconds at most. In this way it is possible to use especially rapidly hardening bituminous mixtures FAB, which reduces the manufacturing time of the dishwasher. In addition, release of the bituminous mat 11a from the floor panel 7 during the hardening time of the bituminous mixture is counteracted in this way.

The facility can especially be fully automated and for example controlled by an industrial computer.

FIG. 4 shows a view from below of the floor panel 7 of the previous figures, which is provided with adhesive beads 23a-23d, with the contours of the bitumen mat 11a in this position on pressing together of floor panel 7 and bitumen mat 11a being indicated by dashed lines. In this figure the bitumen mat 11a is shown as "transparent", since otherwise it would conceal the adhesive beads 23a-23d.

The linear adhesive beads 23a-23d, also called adhesive slugs are surrounded at least partly by at least one area 25 to which the bitumen mass is not applied. This enables the application of the bituminous mixture FAB to be speeded up by comparison with those solutions in which the floor panel 7 and/or the bitumen mat 11a only have adhesive applied to their full surface right from the start, since in the inventive method for an identical width BKW of the applied linear adhesive beads 23a-23d the overall path of the required relative movement can be reduced.

By there being further provision, before the bituminous mixture hardens, for pressing the floor panel 7 and the bitumen mat 11a together so that the bituminous mixture spreads out into the bitumen mass-free area 25, so that a full-surface adhesive layer 13 is produced, an especially good anti-drumming is now able to be achieved. The adhesive layer 13 produced in this manner thus especially ensures a close vibration coupling between the floor panel 7 and the bitumen mat 11a, so that a vibration of the floor panel 7 independent of the bitumen mat 11a is largely suppressed.

There is provision in the exemplary embodiment for the bituminous mixture FAB to be applied in the first operating step exclusively to the floor panel 7. This means that the inventive method is able to be carried out especially simply without functional disadvantages. In particular, especially for this reason the floor panel 7 has the bituminous mixture applied to it since this panel is as a rule more rigid than the bituminous mat 11a and is thus easier to handle in the state in which the bituminous mass has not yet hardened.

Advantageously there is provision for a first adhesive bead 23a to be embodied such that it runs before the pressing together of the floor panel 7 and the bitumen mat 11a in a type of closed mesh along an outer edge area 14a of the bitumen mat 11a. In this way an especially durable and stable adhesive connection is achieved so that the danger of the bitumen mat 11a coming loose in subsequent operation of the dishwasher at the outer edge area 14a of the adhesive contact surface GS of the bitumen mat 11a is reduced. In particular the embodiment of the bead-shaped section 13' of the adhesive layer 13 can be promoted in this way, which laterally supports the bitumen mat 11a.

A further mesh-shaped adhesive bead 23b runs in this case along the inner edge area 14b of the bitumen mat 11a which surrounds a breakthrough opening 26 of the floor panel 7 for a pump sump. In this way the adhesive connection is further improved, in that the danger of the bitumen mat 11a coming loose in subsequent operation of the dishwasher at the inner edge area 14b of the bitumen mat 11a which runs around its central breakthrough opening on the adhesive contact surface GS is reduced. In particular the embodiment of a bead-shaped section 13' both along the outer edge RKA and also along the inner edge RKI of the bitumen mat 11a can be promoted which additionally or alternatively laterally supports the bitumen mat 11a.

Furthermore a first serpentine-shaped adhesive bead 23c and a second serpentine-shaped adhesive bead 23d are provided. The serpentine-shaped adhesive beads 23c and 23d enable the surface of the floor panel lying between the edge areas 14a and 14b to be provided evenly and with only one interruption to the application process with the bituminous mixture. This enables the method to be carried out especially rapidly and easily, which applies in particular by comparison with solutions in which individual, i.e. separate adhesive beads with segmented tracks as well as with transverse spacing are set alongside one another.

Advantageously the corner areas 27a-27d of the bitumen mat 11a are rounded off. This enables the adhesion of the adhesive connection to be alternately or additionally improved.

The rounded-off corner areas 27a-27d preferably have a radius of at least 2 mm, preferably at least 4 mm, especially preferably at least 6 mm, and/or of at most 30 mm, preferably at most 20 mm, especially preferably at most 15 mm. The specified minimum values for the radii ensure a good adhesion of the adhesive connection, with it being ensured by the specified maximum radii that even in corner areas of the floor panel 7 anti-drumming and/or sound insulation through the bitumen mat 11a is possible.

Preferably the average width BKW of the adhesive beads 23a-23d amounts to at least 2 mm, preferably at least 4 mm, especially preferably at least 6 mm, and/or at most 30 mm, preferably at most 20 mm, especially preferably at most 15 mm. The specified minimum values enable the overall length of the adhesive beads 23a-23d to be kept small, with a sufficiently even application of the bituminous mixture FAB being applied to the surface, in order during subsequent pressing together of the floor panel 7 and the bitumen mat 11a, to be able to achieve a full-surface adhesive layer 13.

Advantageously the average spacing AKW of the gap GA between two sections running alongside one another, especially running in parallel with one another of an adhesive bead 23a-23d or of a number of adhesive beads 23a-23d amounts to at least 1.0 times the average width of the adhesive bead or of the adhesive beads 23a-d, preferably at least 1.2 times, especially preferably at least 1.5 times and/or at most 4.0 times the width of the adhesive bead or of the adhesive beads, preferably at most 3.0 times, especially preferably at most 2.0 times. The specified minimum values enable the overall length of the adhesive beads 23a-d to be further reduced, with a sufficiently even application of the bituminous mixture FAB per surface being obtained, in order during later pressing together of the floor panel 7 and the bitumen mat 11a to be able to achieve a full-surface adhesive layer 13.

In this case the sprayed-on mass of the bituminous mixture in relation to the surface of the floor panel 7 pointing towards the bitumen mat 11a amounts to at least 0.1 kg/m$^2$, preferably at least 0.2 kg/m$^2$, especially preferably at least 0.3 kg/m$^2$ and/or at most 2.0 kg/m$^2$, especially at most 1.2 kg/m$^2$, especially preferably at most 0.8 kg/m$^2$. The specified minimum values enable a sufficiently stable adhesive connection to be ensured, with the specified maximum values preventing the adhesive layer running during subsequent operation of the dishwasher when heated up.

If necessary the floor panel 7 can also have a number of bitumen mats glued to it, which is of particular advantage if the side of the floor panel to which the mats are to be glued is heavily indented.

In summary a method for manufacturing a dishwasher, especially a household dishwasher with at least one component is thus provided, which is provided with at least one bitumen mat, especially a prefabricated bitumen mat, for noise deadening and/or sound insulation of the component. In this case the respective bitumen mat is glued to the component by a usable, flowable and reactively-hardenable bituminous mixture being applied to the component and/or to the bitumen mat such that at least one adhesive bead is produced which is surrounded by at least one area to which the reactively-hardenable bituminous mixture has not been applied, and in that, before the hardening of the reactively-hardenable bituminous mixture the component and the bitumen mat are pressed together.

Expediently at least one adhesive bead of reactively-hardenable bituminous mixture is embodied and applied to the bitumen mat and/or to the component for which noise is to be deadened and/or sound insulated, such that the original area to which the bituminous mixture has not been applied is covered after the pressing together with the component and the bitumen mat so that a substantially full-surface, i.e. largely completely closed adhesive layer is produced on the contact surfaces of the component and the bitumen mat facing towards each other.

In particular the respective adhesive bead such as 23a-23d for example is applied linearly, in the form of a cord or in the form of a strand to the respective component such as the floor panel 7 for example and/or the respective bitumen mat assigned thereto such as 11a for example before they are pressed together.

In this case it can be especially advantageous for at least one adhesive bead, such as 23c, 23d for example, to be applied in the form of an individual contiguous bead track, especially in a serpentine shape, to the respective component such as 7 for example and/or the bitumen mat such as 11a for example before the component and the bitumen mat are pressed together. This type of application in the form of a continuous bead track ensures an accelerated production sequence compared to application methods in which an adhesive layer is applied right from the start over the full surface, such as by means of a spatula or a brush for example.

As an alternative it may also be sufficient for a number of adhesive beads in the form of number of separate bead tracks to be applied to the component and/or to the respective bitumen mat before the component and the bitumen mat are pressed together.

In particular it can be expedient if, before the respective component and bitumen mat are pressed together, at least one adhesive bead is applied to an edge area of the adhesive contact surface of the component and/or of the bitumen mat such that it surrounds the edge area such as 14a, 14b for example of the respective adhesive contact surface as a part or fully enclosed mesh or ring bead. The edge area can in this case be an outer edge zone along the outer contour of the adhesive contact surface of the bitumen mat and/or the component. It can also be formed however by an inner edge zone, which is arranged for example all around a breakthrough opening in the bitumen mat and/or in the component. A bead track of the reactively-hardenable bituminous mixture following the respective edge area of the bitumen mat and/or of the component in such a way enables the adhesion of the bitumen mat to the component to be improved. An undesired pulling away or peeling off of the bitumen mat, as a result of its own weight for example, from the component, especially in these edge areas of the bitumen mat, can be largely avoided over the product life of the dishwasher. For the same purpose it can also be expedient if necessary for the bitumen mat to have at least one rounded-off corner area.

Furthermore, to increase the adhesion of the bitumen mat on the component, it can also be advantageous for at least one adhesive bead to be embodied and applied such that, when the component and the bitumen mat are pressed together, it is squeezed out of an edge-side adhesive joint such as KF for example between the component and the bitumen mat and encloses an edge section such as the outer edge section RKA for example of the bitumen mat and/or of the component partly or completely.

The invention is based in accordance with the basic principle especially on reactive bitumen surprisingly being suitable as a thick-film adhesive for application of preferably prefabricated bitumen mats to components, especially to plastic components, of a dishwasher. No pretreatment methods are required here in many cases, such as flaming, plasma treatment etc. of the component for which noise is to be deadened and/or sound insulated. The contact adhesive also possesses very good damping properties for reducing vibrations, which additionally meets the objective of noise reduction in addition to noise reduction by the bitumen mat 11a, 11f. The application is advantageously possible using a machine in a two-component method.

In such cases the material K1 and K2 (A and B component) can be mixed by machine and applied directly via a nozzle such as 21 for example.

The mixed-in reactive bitumen material such as FAB (adhesive for bitumen mats) for example can be applied in a linear form or in the shape of the cord, preferably in a serpentine shape, to components such as 2, 6, 7, 9 for example, especially to plastic components such as 7 for example. For subsequent pressing on of the bitumen parches such as 11a-11f for example (bitumen mats) exerting the full surface pressure, the linear, especially serpentine-shape application produces a full-surface or closed adhesive layer 13, which is acoustically advantageous.

The bitumen patches can preferably be applied in less than 60 secs to the reactive bitumen adhesive which has preferably been applied beforehand to the respective component for which noise is to be deadened and/or sound insulated. Otherwise the reaction of the adhesive could have advanced too far and no permanent adhesive connection is possible.

The bitumen patches preferably do not have any sharp outer corners but are rounded off in their corner areas. Radii bring about a better adhesion of the bitumen patches.

A small quantity of adhesive can be chosen in order to avoid the bitumen patches shaking free at high temperatures during subsequent operation.

The following benefits can be obtained in particular:

a. Application of the reactive bitumen adhesive in a serpentine shape possible, b. Application time after mixing of reactive bitumen <60 secs possible, c. Radii possible on the bitumen patches, to achieve better adhesion and no release.

What is claimed is:

1. A method for manufacturing a dishwasher, comprising the steps of:
   applying a usable, flowable and reactively-hardenable bituminous mixture upon at least one member of the dishwasher selected from the group consisting of a bitumen mat and a plastic component, to form at least one adhesive bead which is at least partly surrounded by at least one area which is free of the reactively-hardenable bituminous mixture; and
   gluing the bitumen mat to the plastic component for noise deadening and/or sound insulation of the plastic component by pressing together the plastic component and the bitumen mat before the reactively-hardenable bituminous mixture hardens.

2. The method of claim 1 for manufacturing a household dishwasher.

3. The method of claim 1, wherein the bitumen mat is a prefabricated bitumen mat.

4. The method of claim 1, wherein the at least one adhesive bead from the reactively-hardenable bituminous mixture is applied to the member such that the area which is free of the bituminous mixture is covered after the plastic component and the bitumen mat are pressed together so that an essentially full-surface adhesive layer is produced on confronting contact surfaces between the plastic component and the bitumen mat.

5. The method of claim 1, wherein the bituminous mixture is either applied exclusively to the plastic component or exclusively to the bitumen mat before the plastic component and the bitumen mat are pressed together.

6. The method of claim 1, wherein the adhesive bead is applied substantially linearly, in the form of a cord or a strand to the member before the plastic component and the bitumen mat are pressed together.

7. The method of claim 1, wherein the adhesive bead is configured in the form of a single continuous bead track.

8. The method of claim 1, wherein the adhesive bead is configured in a serpentine shape.

9. The method of claim 1, wherein the applying step is carried out to form a number of adhesive beads in the form of separate bead tracks.

10. The method of claim 1, further comprising the step of applying at least one adhesive bead to an edge area of an adhesive contact surface of the member before the plastic component and the bitumen mat are pressed together, such as to surround the edge area of the adhesive contact surface as a partly or entirely closed mesh or ring bead.

11. The method of claim 1, wherein the bitumen mat has at least one rounded-off corner area.

12. The method of claim 11, wherein the rounded-off corner area has a radius of at least 2 mm.

13. The method of claim 11, wherein the rounded-off corner area has a radius of at least 4 mm.

14. The method of claim 11, wherein the rounded-off corner area has a radius of at least 6 mm.

15. The method of claim 11, wherein the rounded-off corner area has a radius of at most 30 mm.

16. The method of claim 11, wherein the rounded-off corner area has a radius of at most 20 mm.

17. The method of claim 11, wherein the rounded-off corner area has a radius of at most 15 mm.

18. The method of claim 1, wherein at least one adhesive bead squeezes out of an edge-side adhesive joint between the plastic component and the bitumen mat, when the plastic component and the bitumen mat are pressed together, to enclose an edge section of the member partly or entirely.

19. The method of claim 1, wherein the adhesive bead has an average width of at least 2 mm.

20. The method of claim 1, wherein the adhesive bead has an average width of at least 4 mm.

21. The method of claim 1, wherein the adhesive bead has an average width of at least 6 mm.

22. The method of claim 1, wherein the adhesive bead has an average width of at most 30 mm.

23. The method of claim 1, wherein the adhesive bead has an average width of at most 20 mm.

24. The method of claim 1, wherein the adhesive bead has an average width of at most 15 mm.

25. The method of claim 1, wherein an average distance of a gap between two adjacent sections of the at least one adhesive bead amounts to at least 1.0 times an average width of the at least one adhesive bead.

26. The method of claim 1, wherein an average distance of a gap between two adjacent sections of the at least one adhesive bead amounts to at least 1.2 times an average width of the at least one adhesive bead.

27. The method of claim 1, wherein an average distance of a gap between two adjacent sections of the at least one adhesive bead amounts to at least 1.5 times an average width of the at least one adhesive bead.

28. The method of claim 1, wherein an average distance of a gap between two adjacent sections of the at least one adhesive bead amounts to at most 4.0 times an average width of the at least one adhesive bead.

29. The method of claim 1, wherein an average distance of a gap between two adjacent sections of the at least one adhesive bead amounts to at most 3.0 times an average width of the at least one adhesive bead.

30. The method of claim 1, wherein an average distance of a gap between two adjacent sections of the at least one adhesive bead amounts to at most 2.0 times an average width of the at least one adhesive bead.

31. The method of claim 25, wherein the adjacent sections of the at least one adhesive bead extend in parallel relationship to one another.

32. The method of claim 1, wherein the reactively-hardenable bituminous mixture is applied in relation to confronting contact surfaces between the bitumen mat and the plastic component at a mass which amounts to at least 0.1 kg/m$^2$.

33. The method of claim 1, wherein the reactively-hardenable bituminous mixture is applied in relation to confronting contact surfaces between the bitumen mat and the plastic component at a mass which amounts to at least 0.2 kg/m$^2$.

34. The method of claim 1, wherein the reactively-hardenable bituminous mixture is applied in relation to confronting contact surfaces between the bitumen mat and the plastic component at a mass which amounts to at least 0.3 kg/m$^2$.

35. The method of claim 1, wherein the reactively-hardenable bituminous mixture is applied in relation to confronting contact surfaces between the bitumen mat and the plastic component at a mass which amounts to at most 2.0 kg/m$^2$.

36. The method of claim 1, wherein the reactively-hardenable bituminous mixture is applied in relation to confronting contact surfaces between the bitumen mat and the plastic component at a mass which amounts to at most 1.2 kg/m$^2$.

37. The method of claim 1, wherein the reactively-hardenable bituminous mixture is applied in relation to confronting contact surfaces between the bitumen mat and the plastic component at a mass which amounts to at most 0.8 kg/m$^2$.

38. The method of claim 1, wherein a time between production of the bituminous mixture and the pressing together of the plastic component and the bitumen mat amounts to at most 90 sec.

39. The method of claim 1, wherein a time between production of the bituminous mixture and the pressing together of the plastic component and the bitumen mat amounts to at most 75 sec.

40. The method of claim 1, wherein a time between production of the bituminous mixture and the pressing together of the plastic component and the bitumen mat amounts to at most 60 sec.

41. The method of claim 1, further comprising the step of producing the bituminous mixture from a mixture of at least one first component and at least one second component in one of three ways, a first way in which the first component contains a basic binder, a flux oil and a reactive additive which are tailored to each other so that an activator is required for hardening, and in which the second component contains the activator; a second way in which the first component contains a basic binder and a flux oil which are tailored to each other so that reactive additive is required for hardening, and in which the second component contains the reactive additive; a third way in which the first component contains a basic binder and a flux oil which are tailored to each other so that reactive additive and an activator are required for hardening, and in which the second component contains the reactive additive and the activator.

42. The method of claim 1, wherein the first component is a walling section for delimiting a washing compartment of the dishwasher.

43. A dishwasher, comprising:
   at least one plastic component;
   a least one bitumen mat for attachment onto the plastic component for noise deadening and/or deadening sound of the plastic component; and
   a usable, flowable and reactively-hardenable bituminous mixture applied upon at least one member selected from the group consisting of the bitumen mat and the last plastic component to effect the attachment of the bitumen mat onto the plastic component.

44. The dishwasher of claim 43, constructed in the form of a household dishwasher.

45. The dishwasher of claim 43, wherein the bitumen mat is a prefabricated bitumen mat.

46. The dishwasher of claim 43, wherein the bituminous mixture is applied on the member such that at least one adhesive bead is formed by which the bitumen mat and the plastic component are glued to one another.

47. A facility for manufacturing a dishwasher, said facility comprising:
   a device adapted to apply a usable, flowable and reactively-hardenable bituminous mixture applied upon at least one member of the dishwasher selected from the group consisting of a bitumen mat and a plastic component, such that at least one adhesive bead is formed which is surrounded at least partly by at least one area which is free of the reactively-hardenable bituminous mixture; and
   a pressure application unit for pressing together the plastic component and the bitumen mat, thereby effecting noise deadening and/or sound insulation of the component.

48. The facility of claim 47, wherein the adhesive bead has an essentially linear, cordshaped or strand-shaped configuration.

49. The facility of claim 47, wherein the device is constructed to spray the bituminous mixture upon the member in the absence of a spraying upon the at least one area.

50. The facility of claim 47, wherein the device is an extrusion device or a spray device.

* * * * *